United States Patent [19]

Lora et al.

[11] Patent Number: 4,657,993
[45] Date of Patent: Apr. 14, 1987

[54] PHOSPHAZENE HOMOPOLYMERS AND COPOLYMERS HAVING HYDROXYLATED OR AMINO DERIVATIVES OF CARBAZOLE OR OF NAPHTHALENE AS SUBSTITUENTS

[75] Inventors: Silvano Lora, Padova; Francesco Minto, Mestre; Piergiulio DiMarco, Bologna; Gabriele Giro, Forlimpopoli; Giovanni Pezzin, Padova, all of Italy

[73] Assignee: Consiglio Nazionale Delle Ricerche, Rome, Italy

[21] Appl. No.: 828,263

[22] Filed: Feb. 11, 1986

[30] Foreign Application Priority Data

Feb. 11, 1985 [IT] Italy..... 19465 A/85
Apr. 18, 1985 [IT] Italy..... 20406 A/85
Apr. 18, 1985 [IT] Italy..... 20404 A/85

[51] Int. Cl.$^4$ ..................... C08F 283/00; C08G 79/02; C08L 85/02
[52] U.S. Cl. .................... 525/538; 528/167; 528/168; 528/169; 528/399
[58] Field of Search ......... 525/538, 167–169, 525/399

[56] References Cited

U.S. PATENT DOCUMENTS

| | | | |
|---|---|---|---|
| 4,221,900 | 9/1980 | Hergenrother et al. | 528/168 |
| 4,223,102 | 9/1980 | Hergenrother et al. | 528/168 |
| 4,412,066 | 10/1983 | Allcock et al. | 528/168 |
| 4,535,147 | 8/1985 | Myers | 528/321 |
| 4,587,324 | 5/1986 | Mikroyannidis et al. | 528/108 |
| 4,601,843 | 7/1986 | Carr et al. | 252/78.5 |

*Primary Examiner*—Lucille M. Phynes
*Attorney, Agent, or Firm*—Stevens, Davis, Miller & Mosher

[57] ABSTRACT

Polyphosphazene homopolymers and copolymers containing repetitive units represented by the general formula:

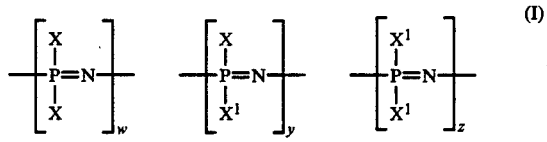

in which the substituents X, which can be equal or different, are represented by the following formulas:

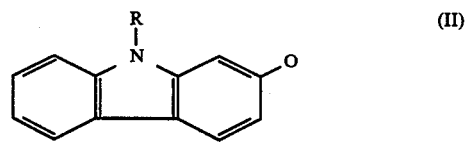

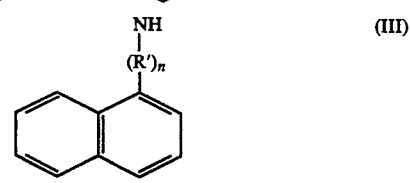

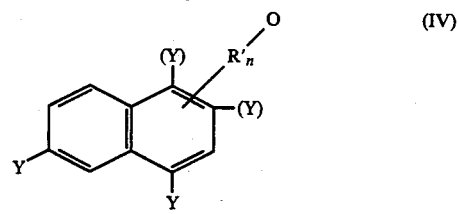

where R is hydrogen or a $C_1$–$C_5$ alkyl group or an aryl or heterocyclic group, with or without substituents, R' is $CH_2$ or an aryl or heterocyclic group, with or without substituents, n is zero or a whole number variable from 1 to 5 and Y is hydrogen or a halogen or a methyl, nitroso or nitro group; the substituents $X^1$ are groups equal to X or halogen, or alkoxy, aryloxy, amino or mercapto groups, either substituted or unsubstituted, or a mixture thereof; the sum (w+y+z) has a value varying from 20 to 50,000.

The polymers of the present invention are prepared from the corresponding poly(dichlorophosphazenes) of general formula $(NPCl_2)_m$ in which m can vary from 20 to 50,000, and can be used as photoconductor materials and for other uses.

11 Claims, No Drawings

PHOSPHAZENE HOMOPOLYMERS AND COPOLYMERS HAVING HYDROXYLATED OR AMINO DERIVATIVES OF CARBAZOLE OR OF NAPHTHALENE AS SUBSTITUENTS

This invention relates to polyphosphazene homopolymers and copolymers containing repetitive units represented by the general formula:

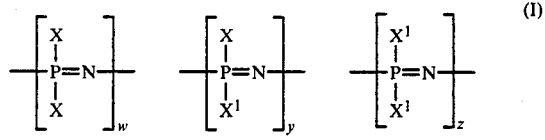

in which the substituents X can be of a single type or of different types, and are represented by the following formulas:

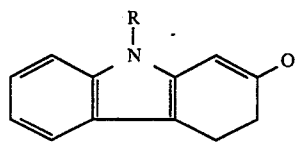

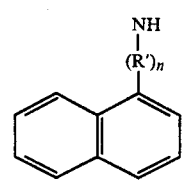

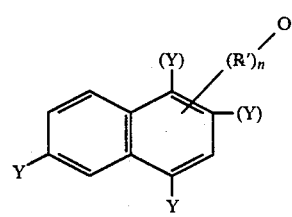

where R is hydrogen or a $C_1-C_5$ alkyl group or an aryl or heterocyclic group, with or without substituents, R' is $CH_2$ or an aryl or heterocyclic group, with or without substituents, n is zero or a whole number variable from 1 to 5, and Y is hydrogen or a halogen or a methyl, nitroso or nitro group; the substituents $X^1$ are grous equal to X or halogens or alkoxy, aryloxy, amino or mercapto groups, either substituted or unsubstituted, or a mixture of them; the sum (w+y+z) has a value varying from 20 to 50,000.

The specific proportion of the substituent groups indicated by X and $X^1$ can be varied within wide limits depending on the chemical and physical properties required and on the required use of the copolymer. Thus, for use as photoconductor material, the copolymer must contain at least 10 mol% of groups (II) or at least 5 mol% of groups (III) or (IV).

Besides their use as photoconductor materials, the copolymers of the present invention can be used in the reproduction of images or for other uses, either alone or in the presence of suitable substances, and they have the advantage over known products of greater absorption towards the visible, better filmability, and greater temperature resistance, according to the particular case. Phosphazene copolymers containing repetitive

units in which alkoxy, aryloxy, amino and mercapto groups, either substituted or unsubstituted, are bonded to the phosphorus atom, and the relative preparation methods, are described in previous publications such as in "Phosphorus-Nitrogen Conpounds", Academic Press, New York, N.Y., 1972 (H. R. Allcock); "Poly(organophosphazenes)" Chem. Tech., Sept. 19, 1975 (H. R. Allcock) and in U.S. Pat. Nos. 3,515,688, 3,702,833, 3,856,712, 3,974,242 and 4,042,561. However, no publication describes or suggests polyphosphazene homopolymers or copolymers containing as substituents the groups (II), (III) or (IV) bonded directly to the phosphorus atom of the phosphazene skeleton.

We have now discovered a process, forming the subject of the present invention, for preparing phosphazene homopolymers and copolymers of general formula (I) with substituents of formula (II), (III) and (IV), as heretofore described.

The homopolymers according to the present invention are prepared by totally reacting the poly(dichlorophosphazene) of formula $(NPCl_2)_m$, in which m varies from 20 to 50,000, in an organic solvent, in the presence or absence of a tertiary amine, and in the presence or absence of a tetrabutylammonium halide, with compounds having respectively the formulas:

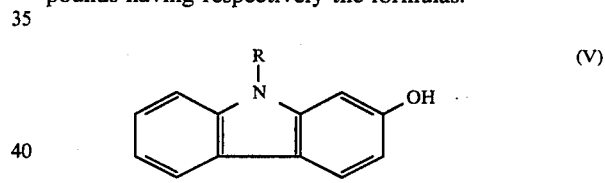

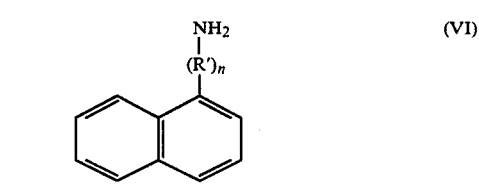

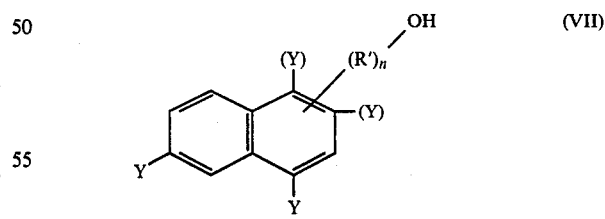

or with the sodium salts of compounds (V) or (VII), the significance of R, R', n and Y being as heretofore stated.

The copolymers according to the present invention are prepared by partially reacting said poly(dichlorophosphazene) with additional reagents, as defined hereinafter, in an organic solvent in the presence of a tertiary amine, followed by reaction with the compounds of formula (V), (VI) or (VII) for the substitution of the chlorine of the starting polymer, whih can be partial or complete.

Alternatively, the copolymers of the present invention are prepared by partially reacting the poly(dichlopophosphazene) in the presence of a tertiary amine and in the presence or absence of a tetrabutylammonium halide, with the compounds of formula (V), (VI) or (VII), and when these compounds have reacted, the residual chlorine atoms of the poly(dichlorophosphazene) can remain unsubstituted or can be substituted by subsequent reaction with said additional reagents, as defined hereinafter.

These and further characteristics of the process for preparing the polyphosphazene homopolymers and copolymers according to the present invention will be more apparent from the description of preferred methods of implementing the process, given hereinafter for illustrative purposes.

The poly(dichlorophosphazene) used as the starting material in the process of the present invention is a known product and is described for example in U.S. Pat. Nos. 3,370,020, 4,005,171 and 4,005,520, and in the already mentioned publications of H. R. Allcock.

It is generally prepared by thermal polymerisation of cyclic oligomers of formula $(NPCl_2)_p$ where p is a whole number between 3 and 7, and in which the cyclic trimer and tetramer often exceed 90% by weight.

The specific temperature, pressure and time conditions used in the thermal polymerisation of said cyclic oligomers can vary considerably depending upon whether catalysts are present or not. In particular, the temperature can vary from about 130° C. to about 300° C., the pressure from $10^{-1}$ Torr to some atmospheres, and the time generally from about one to 48 hours.

The process preferably used is that described in the already mentioned "Phosphorus-Nitrogen Compounds" (H. R. Allcock).

The compounds used as reagents for completely or partially substituting the Cl of the $(NPCl_2)_m$ with the groups (II), (III) or (IV), according to the present invention, comprise as preferred examples: 2-hydroxy-N-methylcarbazole, 2-hydroxy-N-ethylcarbazole, 2-hydroxy-N-propylcarbazole, 2-hydroxy-N-isopropylcarbazole, 2-hydroxy-N-butylcarbazole, 2-hydroxy-N-phenylcarbazole; 1-naphthylamine, 1-naphthylmethylamine and 4-bromo-1-naphthylamine, N-ethyl-1-naphthylamine, 1-(1-naphthylethyl)amine, N-phenyl-1-naphthylamine, 4-Cl- and 4-nitronaphthylamine; 1-naphthol, 2-naphthol, 6-bromo-2-naphthol, 2-naphthaleneethanol, 1-naphthalenemethanol, 1-naphthaleneethanol, 2-Cl- and 4-Cl-1-naphthol, 2-methyl-, 2-nitroso- and 2-nitro-1-naphthol, 1-Br-, 6-Br-, 1-I-, 6-methyl-, 1-nitroso-, 1-nitro- and 1,6-di-Br-2-naphthol and others.

The additional reagents for partially substituting the Cl of the $(NPCl_2)_m$ are:
aliphatic alcohols with 1 to 20 carbon atoms such as methanol, ethanol, propanol, isopropanol, n-butanol, sec-butanol, hexanol, dodecanol and the like;
fluoro-alcohols, especially those represented by the formula $Z(CF_2)_nCH_2OH$ in which Z is a hydrogen or fluorine and n is a whole number between 1 and 10, such as trifluoroethanol; 2,2,3,3,3-pentafluoropropanol, 2,2,3,3,4,4,4-heptafluorobutanol and the like;
aromatic alcohols including phenol, alkylphenols such as cresols, p-, o-, m-ethyl- and propyl-phenols and the like; di- or tri-halosubstituted phenols and the like; alkoxy-substituted phenols such as 4(methoxy)-phenol, 4(n-butoxy)phenol and the like, or with condensed rings such as 1- and 2-naphthol, 1-naphthalenemethanol, 1-naphthaleneethanol, 2-naphthaleneethanol and the like, or mixtures of different aromatic alcohols;
primary and secondary amines such as methylamine, ethylamine, dimethylamine, diethylamine and the like, aromatic amines such as aniline, substituted halo-, alkyl- or alkoxy-anilines or the like;
methylmercaptan and its homologues; ethyl-, propyl-, acyl- or hexyl-mercaptan, thiophenols, thionaphthols, benzyl-, cyclo- or hexyl-mercaptan and the like.

If it is required to incorporate mixtures of different $X^1$ groups in the polymer as substituents, mixtures of said additional reagents are used.

In order to minimise undesired side-reactions, the process according to the present invention is conducted in the presence of tertiary amines.

The tertiary amines which can be used include those represented by the general formula:

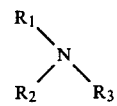

where $R_1$, $R_2$ and $R_3$ are each an alkyl containing from one to eight carbon atoms. Examples of this series of amines are trimethylamine, triethylamine, triisopropylamine, tri-n-propylamine and tri-n-butylamine, but N-methylmorpholine, N-methylpyrrol and the like can also be used, and in addition tertiary amines such as pyridine, and those containing diamino groups such as N,N,N',N'-tetramethylenediamine.

The tertiary amines preferably used are triethylamine, N-methylmorpholine, N,N,N',N'-tetramethylenediamine, pyridine, 1,4-diazabicyclo(2,2,2)octane and dipiperidylethane.

The tetra-n-butylammonium halides act as catalysts in the reaction for substituting the poly(dichlorophosphazene) with the various additives. The halides used are tetra-n-butylammonium iodide, chloride or bromide. The halide preferably used is tetra-n-butylammonium chloride.

The reaction conditions and the reagent proportions used in the synthesis of the homopolymers and copolymers according to the invention can vary widely depending on factors such as the reactivity of the compounds (V), (VI) and (VII) and of the additional reagents, the type of tertiary amine used and the required degree of substitution in the final polymer.

In general, the reaction temperature can vary from 25° C. to 200° C. and the time from 3 hours to 7 days. Low temperatures require longer reaction times and higher temperatures allow shorter reaction times. The reaction is conducted in a solvent or in a mixture of solvents. The solvents used in the reaction must be able to dissolve the poly(dichlorophosphazene), the compounds (V), (VI) and (VII), the additional reagents and the tertiary amine.

Examples of solvents: diglyme, triglyme, chloroform, dioxane, methylene chloride, toluene, xylene, tetrahydrofuran.

The solvent quantity is not critical and any quantity sufficient to dissolve the reagents can be used.

In addition, the solvents must be sufficiently anhydrous in order to eliminate undesired side-reactions by the chlorine atoms of the starting polymer.

Preferably, the reaction mixture contains less than 0.01% of water.

In preparing the homopolymers, the quantity of compound (V) or (VII) must be at least molecularly equivalent, and the quantity of compound (VI) be at least double, with respect to the number of chlorine atoms available in the starting polymer. In preparing the copolymers, the sum of the compounds (V), (VI) or (VII) and the additional compounds must be at least molecularly equivalent to the number of chlorine atoms available in the starting polymer. However, if desired, an excess of said compoounds can be used in order to ensure complete substitution of the chlorine atoms. The tertiary amine must be present in a molar ratio of between 1 and 1.5 with respect to the number of chlorine atoms available in the starting polymer.

Some non-limiting examples are given hereinafter in order to illustrate the nature of the present invention.

EXAMPLE 1

31.5 g (172 millimoles) of 2-hydroxycarbazole, 17.4 g (172 millimoles) of triethylamine, 100 ml of tetrahydrofuran and 10 g (86 millimoles) of poly(dichlorophosphazene) dissolved in 150 ml of tetrahydrofuran are fed into a 500 ml flask.

The flask containing the reagents is heated under agitation to the reflux temperature of the solvent in a stream of nitrogen for 96 hours. The solution becomes slightly dark and a precipitate of triethylammonium chloride separates slowly to the bottom. After filtration, the polymer is recovered by precipitating with a large excess of ethanol and is then purified by repeatedly dissolving in tetrahydrofuran and precipitating in ethanol or water. After drying, 11.2 g of polymer are obtained which on elementary and I.R. analysis is found to be a polymer of formula:

$[NP(OC_{12}H_8N)Cl]_n$ with $[\eta]=1.2$ dl/g and M.W.$=1.5\times 10^6$.
Elementary analysis:

|  | C | H | N | Cl |
|---|---|---|---|---|
| Theoretical % | 54.96 | 3.05 | 10.69 | 13.36 |
| Found % | 55.1 | 3.15 | 10.53 | 12.5 |

I.R. (cm$^{-1}$): 3420 ($\nu$N-H); 1270-1230 ($\nu$P=N); 975 ($\nu$P-O-$\emptyset$); 550-520 ($\nu$P-Cl).

EXAMPLE 2

31.5 g (172 millimoles) of 2-hydroxycarbazole, 17.4 g (172 millimoles) of triethylamine, 100 ml of tetrahydrofuran and 10 g (86 millimoles) of poly(dichlorophosphazene) dissolved in 150 ml of anhydrous tetrahydrofuran are fed into a 500 ml flask.

The flask containing the reagents is heated under agitation to the reflux temperature of the solvent in a stream of nitrogen for 96 hours. The precipitate of triethylammonium chloride which forms is filtered off and is added to 15.6 g (100 millimoles) of 1-naphthalenemethylamine in 50 ml of tetrahydrofuran and the mixture heated under reflux for 24 hours. After further filtration the polymer is recovered by precipitation in an excess of ethanol and is then purified by repeatedly precipitating in ethanol from tetrahydrofuran solutions. After drying, 13.5 g of a product are obtained which on elementary and I.R. analysis is found to have the formula:

$[NP(OC_{12}H_8N)(NHCH_2C_{10}H_7)]_n$ with $[\eta]=0.70$ dl/g and M.W.$=8\times 10^5$
Elementary analysis:

|  | C | H | N | Cl |
|---|---|---|---|---|
| Theoretical % | 72.06 | 4.70 | 10.97 | 0 |
| Found % | 69.45 | 4.70 | 10.87 | 0.5 |

I.R. (cm$^{-1}$): 3420 ($\nu$N-H); 1270-1230 ($\nu$P=N); 965 ($\nu$P-O-$\emptyset$).

EXAMPLE 3

2 g (7.6 millimoles) of the product of Example 1 dissolved in 20 ml of tetrahydrofuran are fed into a 100 ml flask, and 20 ml of a solution containing 1.5 g (9 millimoles) of the sodium salt of $\beta$-naphthol in tetrahydrofuran are added to the former solution dropwise. The mixture is heated under reflux for 24 hours, the polymer is recovered by precipitation in ethanol and is purified by repeated precipitation in ethanol from tetrahydrofuran solutions. After drying, 2.5 g of polymer are obtained which on elementary and I.R. analysis is found to have the formula:

$[NP(OC_{12}H_8N)(OC_{10}H_7)]_n$ with $[\eta]=0.75$ dl/g and M.W.$=8.5\times 10^5$
I.R. (cm$^{-1}$): 3420 ($\nu$N-H); 1280-1230 ($\nu$P=N); 970-930 ($\nu$P-O-$\emptyset$)
Elementary analysis:

|  | C | H | N | Cl |
|---|---|---|---|---|
| Theoretical % | 71.35 | 4.05 | 7.57 | 0 |
| Found % | 67.6 | 3.94 | 7.77 | 2.5 |

EXAMPLE 4

2 g (7.5 millimoles) of the product of Example 1 dissolved in 20 ml of tetrahydrofuran are fed into a 100 ml flask, and 20 ml of a solution containing 1.2 g (10 millimoles) of the sodium salt of trifluoroethanol in tetrahydrofuran are added dropwise to the former solution. The mixture is heated under reflux for 24 hours and the polymer recovered by precipitation in benzene and purified by repeated precipitation in benzene from tetrahydrofuran solutions. Elementary and I.R. analysis indicate that the polymer is of formula:

$[NP(OC_{12}H_8N)(OC_2H_2F_3)]_n$ with $[\eta]=0.70$ dl/g and M.W.$=8\times 10^5$
I.R. (cm$^{-1}$): 3420 ($\nu$N-H); 1290-1230 ($\nu$P=N); 965 ($\nu$P-O-$\emptyset$); 1080 ($\nu$CF$_3$)
Elementary analysis:

|  | C | H | N |
|---|---|---|---|
| Theoretical % | 51.5 | 3.07 | 8.59 |
| Found % | 51.45 | 3.20 | 8.7 |

EXAMPLE 5

2 g (7.5 millimoles) of the product of Example 1 dissolved in 20 ml of anhydrous tetrahydrofuran are fed into a 100 ml flask, and 20 ml of a solution containing 1.5 g (13 millimoles) of the sodium salt of phenol in tetrahydrofuran are added dropwise to the former solution. The mixture is heated under reflux for 24 hours and the polymer recovered by precipitation in methanol, and purified by repeated precipitation in methanol from tetrahydrofuran solutions. Elementary and I.R. analysis indicate that the polymer is of formula:

[NP(OC$_{12}$H$_8$N)(OC$_6$H$_5$)]$_n$ with $[\eta]=0.80$ dl/g and M.W.$=9\times10^5$ Elementary analysis:

|  | C | H | N | Cl |
|---|---|---|---|---|
| Theoretical % | 67.50 | 4.06 | 8.75 | 0 |
| Found % | 66.9 | 4.09 | 9.05 | 0.9 |

I.R. (cm$^{-1}$): 3420 ($\nu$N-H); 1250-1230 ($\nu$P=N); 970 ($\nu$P-O-$\emptyset$).

EXAMPLE 6

10 g (86 millimoles) of poly(dichlorophosphazene) are dissolved in 250 ml of anhydrous tetrahydrofuran under a stream of nitrogen in a 500 ml flask, and 100 ml of a solution containing 5.0 g (35 millimoles) of 1-naphthol and 17.2 g (172 millimoles) of triethylamine in tetrahydrofuran are added dropwise to the former solution. The flask containing the reagents is heated under agitation to the reflux temperature of the solvent in a stream of nitrogen for 3 hours. 47.1 g (300 millimoles) of 1-naphthalenemethylamine in 100 ml of tetrahydrofuran are then added and the mixture heated under reflux for 12 hours. The precipitate formed is filtered off and the polymer is recovered from the solution by precipitation with 1000 ml of methanol, and then purified by further precipitation with methanol from a tetrahydrofuran solution. After drying, 15.6 g of a white powder are obtained which on elementary and I.R. analysis is found to have the following formula:

[NP(OC$_{10}$H$_7$)$_{0.4}$(NHCH$_2$C$_{10}$H$_7$)$_{1.6}$]$_n$

Elementary analysis:

|  | C | H | N | Cl |
|---|---|---|---|---|
| Theoretical % | 73.68 | 5.34 | 10.35 | 0 |
| Found % | 73.77 | 5.32 | 10.42 | traces |

I.R. (cm$^{-1}$): 3370 ($\nu$N-H); 1270-1230 ($\nu$P=N); 915 ($\nu$P-O-$\emptyset\emptyset$) with $[\eta]=0.70$ dl/g and M.W.$=7.0\times10^5$

EXAMPLE 7

10 g (86 millimoles) of poly(dichlorophosphazene) are dissolved in 250 ml of anhydrous tetrahydrofuran under a stream of nitrogen in a 500 ml flask, and 100 ml of a solution containing 5.0 g (35 millimoles) of 2-naphthol and 17.2 g (172 millimoles) of triethylamine in tetrahydrofuran are added dropwise to the former solution. The flask containing the reagents is heated under agitation to the reflux temperature of the solvent under a stream of nitrogen for 3 hours. 47.1 g (300 millimoles) of 1-naphthalenemethylamine in 100 ml of tetrahydrofuran are then added and the mixture heated under reflux for 12 hours. The precipitate formed is centrifuged and the polymer is recovered by precipitation with 1000 ml of methanol, filtered off and washed thoroughly with methanol. After drying, 17.5 g of white powder are obtained which on elementary and I.R. analysis is found to have the following formula:

[NP(OC$_{10}$H$_7$)$_{0.4}$(NHCH$_2$C$_{10}$H$_7$)$_{1.6}$]$_n$

Elementary analysis:

|  | C | H | N | Cl |
|---|---|---|---|---|
| Theoretical % | 73.68 | 5.34 | 10.35 | 0 |
| Found % | 73.20 | 5.27 | 10.24 | traces |

I.R. (cm$^{-1}$): 3370 ($\nu$N-H); 1260-1225 ($\nu$P=N); 970-930 ($\nu$P-O-$\emptyset\emptyset$) with $[\eta]=0.74$ dl/g and M.W.$=800,000$

EXAMPLE 8

10 g (86 millimoles) of poly(dichlorophosphazene) are dissolved in 250 ml of anhydrous tetrahydrofuran under a stream of nitrogen in a 500 ml flask, and 100 ml of a solution containing 6.6 g (70 millimoles) of phenol and 17.2 g (172 millimoles) of triethylamine in tetrahydrofuran are added dropwise to the former solution. The flask containing the reagents is heated under agitation to the reflux temperature of the solvent under a stream of nitrogen for 3 hours. 47.1 g (300 millimoles) of 1-naphthalenemethylamine in 100 ml of tetrahydrofuran are then added, and the mixture left standing for 12 hours. The precipitate formed is filtered off and the polymer recovered from the solution by precipitation in an excess of methanol, and is washed thoroughly with methanol to obtain, after drying, 18.3 g of a powdery polymer which on elementary and I.R. analysis is found to have the following formula:

[NP(OC$_6$H$_5$)$_{0.8}$(NHCH$_2$C$_{10}$H$_7$)$_{1.2}$]$_n$

Elementary analysis:

|  | C | H | N | Cl |
|---|---|---|---|---|
| Theoretical % | 70.45 | 5.22 | 10.05 | 0 |
| Found % | 69.95 | 5.30 | 10.15 | 1 |

I.R. (cm$^{-1}$): 3370 ($\nu$N-H); 1230-1170 ($\nu$P=N); 910 ($\nu$P-O-$\emptyset\emptyset$) with $[\eta]=0.55$ dl/g and M.W.$=5.0\times10^5$.

EXAMPLE 9

10 g of poly(dichlorophosphazene) dissolved in 200 ml of anhydrous tetrahydrofuran are fed into a 500 ml flask, and 200 ml of a solution containing 62.8 (400 millimoles) of 1-naphthylmethylamine are added dropwise to the former solution. The mixture is allowed to stand for 24 hours under agitation, and the polymer is then recovered by filtration and washed thoroughly with water and methanol. After drying, 19 g of a slightly yellow product are obtained which on elementary and I.R. analysis is found to have the following formula:

[NP(NHCH$_2$C$_{10}$H$_7$)$_2$]$_n$

Elementary analysis:

|  | C | H | N | Cl |
|---|---|---|---|---|
| Theoretical % | 73.54 | 6.13 | 11.7 | 0 |

-continued

| | C | H | N | Cl |
|---|---|---|---|---|
| Found % | 72.5 | 6.20 | 12 | 0.5 |

I.R. (cm$^{-1}$): 3370 ($\nu$N-H); 1250-1190 ($\nu$P=N)

EXAMPLE 10

150 ml of a solution containing 5 g of poly(dichlorophosphazene) (43 millimoles) in anhydrous tetrahydrofuran are fed into a 500 ml flask, and 400 ml of an equimolar solution of 4-bromo-1-naphthylamine and 1-naphthylamine (300 millimoles in total) are added dropwise to the former solution. The mixture is left to react for 24 hours and is heated under reflux for a further 24 hours.

The polymer is recovered by precipitation in methanol, and is purified by repeated precipitation in tetrahydrofuran. After drying, 12 g of product are obtained which on elementary and I.R. analysis is found to have the following formula:

[NP(NHC$_{10}$H$_7$)(NHC$_{10}$H$_6$Br)]$_n$

Elementary analysis:

| | C | H | N | Halogens |
|---|---|---|---|---|
| Theoretical % | 58.84 | 3.68 | 10.30 | 19.6 |
| Found % | 57.5 | 3.52 | 10.45 | 20.1 |

I.R. (cm$^{-1}$): 3390-3370 ($\nu$N-H); 1250-1200 ($\nu$P=N) with [$\eta$]=0.70 dl/g and M.W.=7.3×10$^5$ The products obtained in the described examples have better filmability characteristics than products of the known art used for the same purpose.

EXAMPLE 11

10 g (86 millimoles) of poly(dichlorophosphazene) are dissolved in 250 ml of anhydrous tetrahydrofuran under a nitrogen stream in a 500 ml flask, and 100 ml of a solution containing 44.6 g (200 millimoles) of 6-bromo-2-naphthol and 20 g (200 millimoles) of triethylamine in tetrahydrofuran are added to the former solution dropwise.

The flask containing the reagents is heated under agitation to the reflux temperature of the solvent under a stream of nitrogen for 3 hours. The precipitate formed is filtered off and the polymer is recovered by precipitation by treating with 1000 ml of methanol and is then purified by further precipitation with methanol from a tetrahydrofuran solution. After drying, 23 g of a white powder are obtained which on elementary and I.R. analysis is found to have the following formula:

[NP(OC$_{10}$H$_6$Br)$_2$]$_n$

Elementary analysis:

| | C | H | N | |
|---|---|---|---|---|
| Theoretical % | 49.08 | 2.45 | 2.86 | Br = 32.7 |
| Found % | 48.9 | 2.50 | 3.15 | Halogens = 31.5 |

I.R. (cm$^{-1}$): 1240 ($\nu$P=N); 970-940 ($\nu$P-O-$\phi\phi$) with [$\eta$]=1.1dl/g and M.W.=1.2×10$^6$

EXAMPLE 12

10 g (86 millimoles) of poly(dichlorophosphazene) are dissolved in 250 ml of anhydrous tetrahydrofuran in a 500 ml flask, and 100 ml of a solution containing 19.2 g (86 millimoles) of 6-bromo-2-naphthol and 20 g (200 millimoles) of triethylamine in tetrahydrofuran are added dropwise to the former solution. The flask containing the reagents is heated under agitation to the reflux temperature of the solvent under a stream of nitrogen for 3 hours. 21.6 g (150 millimoles) of 2-naphthol dissolved in 100 ml of tetrahydrofuran are then added and the mixture heated under reflux for 36 hours.

The precipitate formed is centrifuged and the polymer recovered by precipitation with 100 ml of methanol, filtered off and washed thoroughly with methanol. After drying, 19 g of white material are obtained which on elementary and I.R. analysis is found to have the following formula:

[NP(OC$_{10}$H$_6$Br)(OC$_{10}$H$_7$)]$_n$

Elementary analysis:

| | C | H | N | |
|---|---|---|---|---|
| Theoretical % | 58.54 | 3.17 | 3.41 | Br = 19.5 |
| Found % | 57.8 | 3.4 | 3.52 | Halogens = 20.7 |

I.R. (cm$^{-1}$): 1240 ($\nu$P=N); 975-940 ($\nu$P-O-$\phi\phi$); with [$\eta$]=0.84 dl/g and M.W.=900,000

EXAMPLE 13

10 g (86 millimoles) of poly(dichlorophosphazene) are dissolved in 250 ml of anhydrous tetrahydrofuran in a 500 ml flask, and 100 ml of a solution containing 12.4 g (86 millimoles) of 1-naphthol and 20 g (200 millimoles) of triethylamine in tetrahydrofuran are added to the former solution dropwise.

The flask containing the reagents is heated under agitation to the reflux temperature of the solvent under a stream of nitrogen for 3 hours. 30.0 g (208 millimoles) of 2-naphthol dissolved in 100 ml of tetrahydrofuran are then added and the mixture heated under reflux for 30 hours. The precipitate formed is centrifuged and the polymer recovered by precipitation with 1000 ml of methanol, filtered off and washed thoroughly with methanol. After drying, 17.5 g of white material are obtained which on elementary and I.R. analysis is found to have the following formula:

[NP(1-OC$_{10}$H$_7$)(2-OC$_{10}$H$_7$)]$_n$

Elementary analysis:

| | C | H | N | Cl |
|---|---|---|---|---|
| Theoretical % | 72.51 | 4.23 | 4.23 | 0 |
| Found % | 73.2 | 4.10 | 4.35 | 1.2 |

I.R. (cm$^{-1}$): 1260-1240 ($\nu$P=N); 975-940 ($\nu$P-O-$\phi\phi$) with [$\eta$]=0.95 dl/g and M.W.=9.5×10$^5$

EXAMPLE 14

10 g (86 millimoles) of poly(dichlorophosphazene) are dissolved in 250 ml of anhydrous tetrahydrofuran in a 500 ml flask, and 100 ml of a solution containing 14.8 g (86 millimoles) of 1-naphthaleneethanol and 20 g (200 millimoles) of triethylamine in tetrahydrofuran are added to the former solution dropwise.

The flask containing the reagents is heated under agitation to the reflux temperature of the solvent under a stream of nitrogen for 3 hours. 44.6 g (200 millimoles) of 6-bromo-2-naphthol dissolved in 100 ml of tetrahydrofuran are then added and the mixture kept under reflux for 48 hours. The precipitate formed is filtered off and the polymer recovered from the solution by precipitation with 1000 ml of methanol, washed thoroughly with methanol and dried to obtain 25 g of a powdery polymer which on elementary and I.R. analysis is found to have the following formula:

[NP(OC$_{10}$H$_6$Br)(OCH$_2$CH$_2$C$_{10}$H$_7$)]$_n$

Elementary analysis:

|   | C | H | N |   |
|---|---|---|---|---|
| Theoretical % | 60.27 | 3.88 | 3.20 | Br = 18.26 |
| Found % | 59.9 | 3.70 | 3.10 | Halogens = 19.45 |

I.R. (cm$^{-1}$): 1260-1240 ($\nu$P=N); 970-940 ($\nu$P-O-$\emptyset\emptyset$) with [$\eta$]=0.70 dl/g and M.W.=7×10$^5$

We claim:

1. Polyphosphazene homopolymers and copolymers containing repetitive units represented by the following general formula:

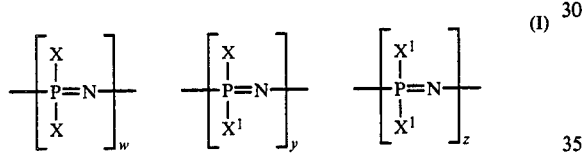

in which the substituents X, which can be equal or different, are represented by the following formulas:

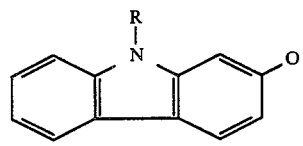

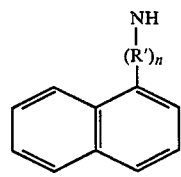

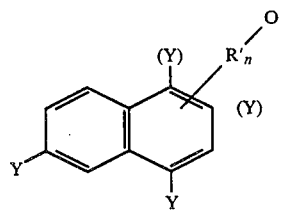

where R is hydrogen or a C$_1$-C$_5$ alkyl group or an aryl or heterocyclic group, with or without substituents, R' is CH$_2$ or an aryl or heterocyclic group, with or without substituents, n is zero or a whole number variable from 1 to 5 and Y is hydrogen or a halogen or a methyl, nitroso or nitro group; the substituents X$^1$ are groups equal to X or halogens or alkoxy, aryloxy, amino or mercapto groups, either substituted or unsubstituted, or a mixture of them; the sum (w+y+x) has a value varying from 20 to 50,000.

2. Phosphazene homopolymers and copolymers as claimed in claim 1, wherein the ratio of said substituents X to said substituents X$^1$ is such that X represents at least 5 mol% of the sum X+X$^1$.

3. A process for preparing polyphosphazene homopolymers and copolymers containing repetitive units represented by the following general formula:

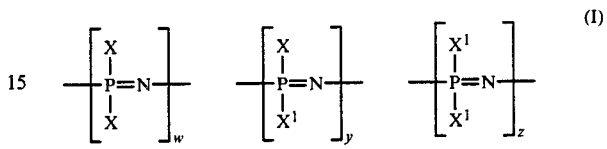

in which the substituents X, which can be equal or different, are represented by the following formulas:

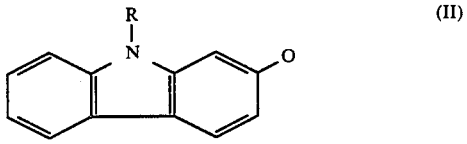

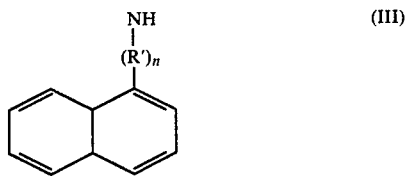

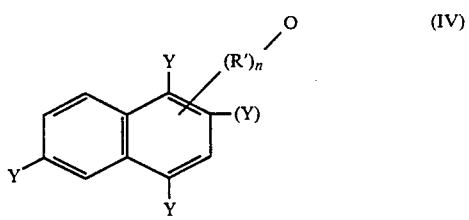

where R is a hydrogen or a C$_1$-C$_5$ alkyl group or an aryl or heterocyclic group, with or without substituents, R' is CH$_2$ or an aryl or heterocyclic group, with or without substituents, n is zero or a whole number variable from 1 to 5 and Y is hydrogen or a halogen or a methyl, nitroso or nitro group; the substituents X$^1$ are groups equal to X or halogens or are oxy, aryloxy, amino or mercapto groups, either substituted or unsubstituted, ir a mixture of them; the sum (w+y+z) has a value varying from 20 to 50,000, characterised in that said homopolymers are prepared by totally reacting the poly(dichlorophosphazene) of general formula (NPCl$_2$)$_m$, in which m varies from 20 to 50,000, in an organic solvent in the presence or absence of a tertiary amine and in the presence or absence of a tetrabutylammonium halide, with compounds of formula

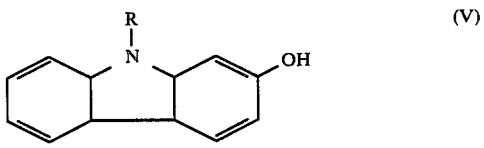

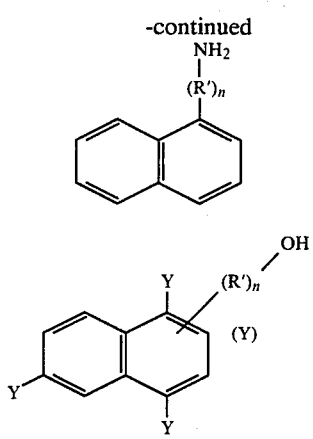

or with the sodium salts of compounds (V) or (VII), the significance of R, R', n and Y being as heretofore defined, and said copolymers are prepared by partially reacting said poly(dichlorophosphazene) with additional reagents, in an organic solvent in the presence of a tertiary amine, followed by reacting with the compounds of formulas (V), (VI) or (VII) for partially or completely substituting the chlorine of the starting polymer, said copolymers also being able to be prepared by partially reacting the poly(dichlorophosphazene), in the presence of a tertiary amine and in the presence or absence of a tetrabutylammonium halide, with the compounds of formulas (V), (VI) or (VII) followed by partially or totally reacting the residual poly(dichlorophosphazene) with additional reagents.

4. A process as claimed in claim 3, characterised in that said compounds of formulas (V), (VI) and (VII) comprise 2-hydroxy-N-methylcarbazole, 2-hydroxy-N-ethylcarbazole, 2-hydroxy-N-propylcarbazole, 2-hydroxy-N-isopropylcarbazole, 2-hydroxy-N-butylcarbazole, 2-hydroxy-N-phenylcarbazole; 1-naphthylamine, 1-naphthylmethylamine and 4-bromo-1-naphthylamine, N-ethyl-1-naphthylamine, 1-(1-naphthylethyl)amine, N-phenyl-naphthylamine, 4-Cl- and 4-nitronaphthylamine; 1-naphthol, 2-naphthol, 6-bromo-2-naphthol, 2-naphthaleneethanol, 1-naphthalenemethanol, 1-naphthaleneethanol, 2-Cl- and 4-Cl-1-naphthol, 2-methyl-, 2-nitroso- and 2-nitro-1-naphthol, 1-Br-, 6-Br-, 1-I-, 6-methyl-, 1-nitroso-, 1-nitro- and 1,6-di-Br-2-naphthol.

5. A process as claimed in claim 3, characterised in that said additional reagents comprise: aliphatic alcohols of 1 to 20 carbon atoms such as methanol, ethanol, propanol, iso-propanol, n-butanol, sec-butanol, hexanol, dodecanol; fluoro-alcohols such as trifluoroethanol, 2,2,3,3,3-pentafluoropropanol, 2,2,3,3,4,4,4-heptafluorobutanol; aromatic alcohols comprising phenol, alkylphenols such as cresols, p-, o-. n-ethyl and propylphenols; di- or tri-halosubstituted phenols; 4(methoxy)-phenol; 4(n-butoxy)phenol, 1- and 2-naphthol, 1-naphthalenemethanol, 1-naphthaleneethanol, 2-naphthaleneethanol, or mixtures thereof; primary and secondary amines such as methylamine, ethylamine, dimethylamine, aniline and halo-, alkyl- and alkoxyanilines; mercaptans such as methylmercaptan, ethyl-, propyl-, acyl-, hexyl-mercaptan, thiophenols, thionaphthols, benzyl- and cyclohexylmercaptan.

6. A process as claimed in claim 3, characterised in that said tertiary amines are trimethylamine, triethylamine, triisopropylamine, tri-n-propylamine, tri-isobutylamine. tri-n-butylamine, pyridine, N,N,N',N'-tetramethylethylenediamine, N-methylmorpholine, 1,4-diazobicyclo(2,2)octane and dipiperidylethane.

7. A process as claimed in claim 3, characterised in that said organic solvent is diglyme, triglyme, chloroform, dioxane, methylene chloride, xylene and tetrahydrofuran, or mixtures thereof, containing less than 0.01% of water.

8. A process as claimed in claim 3, characterised in that said reactions of the poly(dichlorophosphazene) are conducted at a temperature of between 25° and 200° C. for a time of between 3 hours and 7 days.

9. A process as claimed in claim 3, characterised in that in preparing said homopolymers, the quantity of compound (V) and compound (VII) is at least molecularly equivalent to the number of chlorine atoms available in the poly(dichlorophosphazene).

10. A process as claimed in claim 3, characterised in that in preparing said homopolymers, the quantity of compound (VI) is at least molecularly equivalent to double the chlorine atoms available in said poly(dichlorophosphazene).

11. A process as claimed in claim 3, characterised in that in preparing said copolymers, the sum of compounds (V), (VI) and (VII) and the additional compounds is at least molecularly equivalent to the number of chlorine atoms of the poly(dichlorophosphazene).

* * * * *